(12) United States Patent
Ando

(10) Patent No.: US 6,766,461 B1
(45) Date of Patent: Jul. 20, 2004

(54) STATUS SWITCHING METHOD OF AN INFORMATION APPARATUS TO ENSURE AN OPERATING STATUS WHEN THE APPARATUS IS LIABLE TO RECEIVE VIBRATION OR SHOCK

(75) Inventor: Motoaki Ando, Ome (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 553 days.

(21) Appl. No.: 09/716,459

(22) Filed: Nov. 21, 2000

(30) Foreign Application Priority Data

Nov. 30, 1999 (JP) .......................................... 11-340492

(51) Int. Cl.$^7$ ............................ G06F 1/26; G06F 11/00
(52) U.S. Cl. ............................ 713/323; 714/15; 714/24
(58) Field of Search .............................. 713/323, 321, 713/320, 300, 310; 714/24, 22

(56) References Cited

U.S. PATENT DOCUMENTS

| | | | |
|---|---|---|---|
| 4,907,150 A | * 3/1990 | Arroyo et al. | ............... 713/323 |
| 5,303,171 A | * 4/1994 | Belt et al. | .................... 713/321 |
| 5,485,623 A | 1/1996 | Kurokawa et al. | |
| 6,069,588 A | * 5/2000 | O'Neill, Jr. | .................. 343/713 |
| 6,618,813 B1 | * 9/2003 | Hsu et al. | .................... 713/323 |

FOREIGN PATENT DOCUMENTS

| | | | |
|---|---|---|---|
| JP | 2898616 | 3/1999 | |
| JP | 11282564 A | * 10/1999 | ............. G06F/1/00 |

OTHER PUBLICATIONS

IBM, A Data Backup Method for Computers having Removable HDDs, Sep. 1, 2000, Issue 437, p. 1682.*

* cited by examiner

Primary Examiner—Thomas Lee
Assistant Examiner—Suresh K Suryawanshi
(74) Attorney, Agent, or Firm—Finnegan, Henderson, Farabow, Garrett & Dunner, L.L.P.

(57) ABSTRACT

When the system of an information processing apparatus is set to effectively perform a wake-up function in response to a specified event including reception of a signal from a radio communication system, such as Bluetooth, there is a possibility of the resume process being performed under an unsteady condition where the apparatus is liable to receive vibration or shock. In this case, a vibration-resistant memory device, such as a semiconductor memory device, is forcibly selected as the place for storing the operating status by the suspend/resume function regardless of the user's selection, even if a hard disk drive which is less vibration-resistant is selected as the storage place.

14 Claims, 3 Drawing Sheets

STATUS SWITCHING METHOD OF AN INFORMATION APPARATUS TO ENSURE AN OPERATING STATUS WHEN THE APPARATUS IS LIABLE TO RECEIVE VIBRATION OR SHOCK

CROSS-REFERENCE TO RELATED APPLICATIONS

This application is based upon and claims the benefit of priority from the prior Japanese Patent Application No. 11-340492, filed Nov. 30, 1999, the entire contents of which are incorporated herein by reference.

BACKGROUND OF THE INVENTION

The present invention relates to an information processing apparatus, such as a notebook-type apparatus, which can be operated by a battery, and a status switching method of the apparatus, and more particularly to a portable information processing apparatus and a status switching method of the apparatus for executing a suspending process to ensure that an operating status, at a time when the power is turned off, can be restored, even in an unsteady condition wherein the apparatus is liable to receive vibration or shock.

In recent years, various types of personal computers, for example, notebook-types and hand-held-types, have been developed. Such a personal computer is easy to carry and can be operated by a battery. Many of the personal computers of this kind have a suspend/resume function. With this function, when the power switch is turned off, an operating status of the system is stored in a semiconductor memory device or a hard disk drive. At a restart time, the system is restored to its previous operating status. As a result, the user can use the system in the previous status. Whether the system operating status is stored in the semiconductor memory or the hard disk drive in the suspend/resume function can be determined by the user through a system setting screen which is, for example, pop-up displayed. The mode for storing the status in the semiconductor memory is called STR (Suspend to RAM) and the mode for storing it in the hard disk drive is called STD (Suspend to Disk).

STR has a characteristic that the restart requires a short period of reset time, and the status is stored for a relatively short period of time. In contrast, STD has a characteristic that the restart requires a long period of reset time, and the status is stored for a relatively long period of time. Therefore, the user selects either STR or STD in consideration of the aforementioned characteristic and his/her usage pattern.

In addition, many of the personal computers of this type have a wake-up function for automatically restarting the system at an occurrence of a predetermined event, such as reception of a call through a public cable network or reception of a packet through a LAN (Local Area Network), not only at the turn-on of the power switch.

Recently, a personal computer equipped with a so-called radio communication system, such as Bluetooth, has been developed. Bluetooth carries out radio communications with an external device using radio waves in, for example, the 2.45 GHz frequency band. Further, developers are considering usage of signal reception of the radio communication system as a specified event at which the wake-up function is performed.

However, signal reception of the radio communication system does not necessarily occur in a steady condition, unlike the reception of a call through a public cable network or the reception of a packet through a LAN mentioned above. More specifically, a call through a public cable network or a packet through a LAN is naturally received under a steady condition, for example, on a desk or the like, since the network involves cable connection. On the other hand, in the radio communication system which does not require cable connection, a signal can be received under even an unsteady condition, for example, while the apparatus is being carried when it easily receives vibration or shock.

Therefore, when the system is operated to effectively perform the wake-up function in response to a specified event including reception of a signal from a radio communication system and the STD mode is selected for the suspend/resume function, the hard disk drive which has a relatively low resistance to vibration may be operated under a very unsteady condition. In this case, there is a probability that the previous internal status cannot be restored.

BRIEF SUMMARY OF THE INVENTION

An object of the present invention is to provide an information processing apparatus and a status switching method of the apparatus for executing a suspending process to ensure that an operating status, at a time when the power is turned off, can be restored, even in an unsteady condition wherein the apparatus is liable to receive vibration or shock.

To achieve the above object, according to an aspect of the present invention, when the system of the information processing apparatus is set to effectively perform the wake-up function in response to a specified event including reception of a signal from a radio communication system, such as Bluetooth, i.e., when there is a possibility of the resume process being performed under an unsteady condition where the apparatus is liable to receive vibration or shock, a vibration-resistant memory device, such as a semiconductor memory device, is set as the place for storing the operating status by the suspend/resume function regardless of the user's selection.

In the information processing apparatus of the present invention, when there is a possibility that the apparatus is restarted by the suspend/resume function under a very unsteady condition, STR using a semiconductor memory device, which is resistant to vibration, is forcibly selected regardless of the setting by the user. Therefore, corruption of data or a breakdown of the apparatus will never occur. As a result, it is ensured that the previous operating status is restored.

According to another aspect of the present invention, when the system of the information processing apparatus is set to effectively perform the wake-up function in response to a specified event including reception of a signal from a radio communication system, such as Bluetooth, i.e., when there is a possibility of the resume process being performed under an unsteady condition where the apparatus is liable to receive vibration or shock, the apparatus gives the user a warning of the above matter.

In the information processing apparatus of the present invention, when there is a possibility that the apparatus is restarted by the suspend/resume function under a very unsteady condition and STD using the hard disk drive (which has a relatively low vibration resistance) is selected, the apparatus gives a warning to prompt the user to change the mode from STD to STR. Thus, corruption of data or a breakdown of the apparatus is prevented.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will be described with reference to the accompanying drawings.

Figure 1:
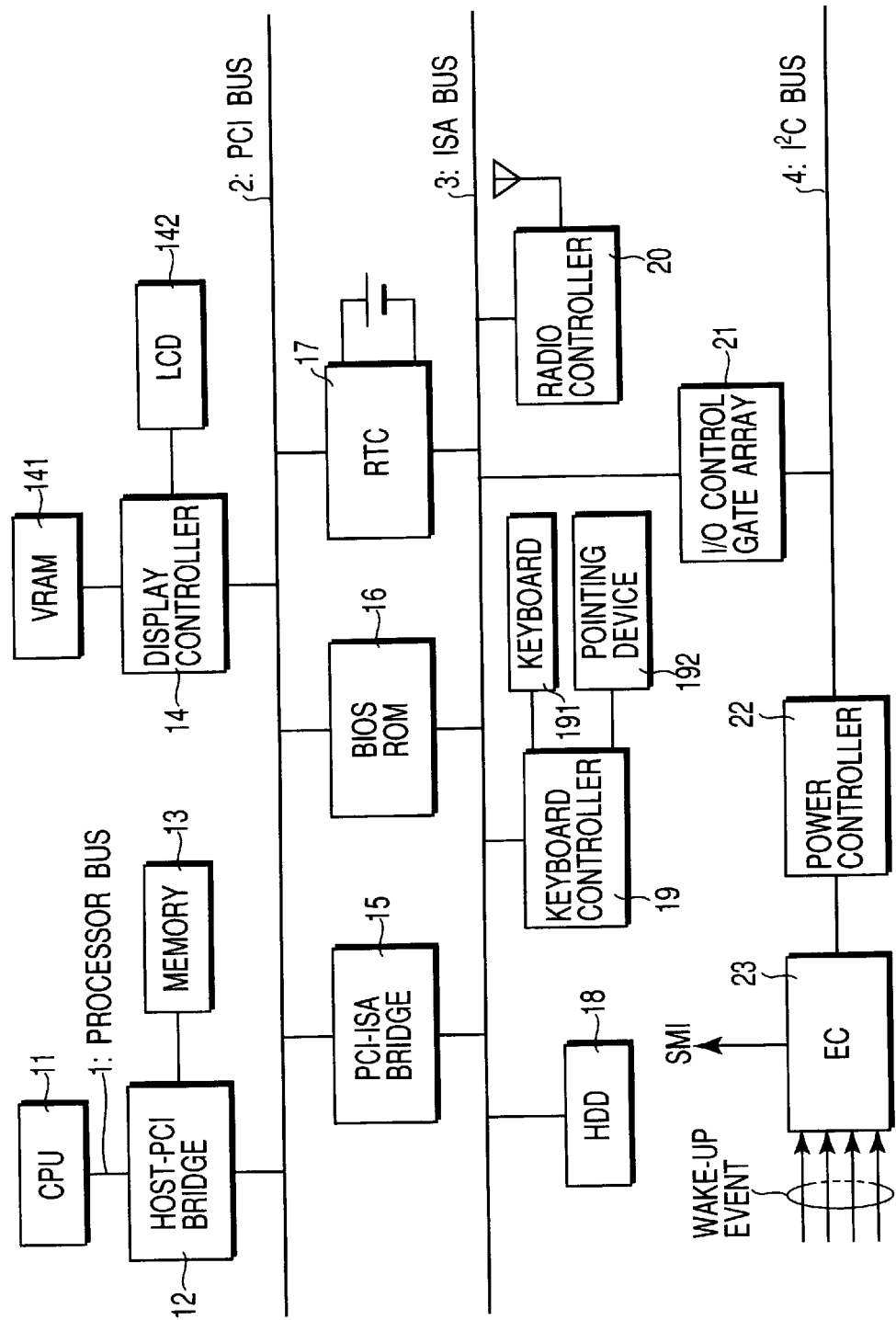
FIG. 1 is a schematic diagram showing a computer system according to an embodiment of the present invention.

FIG. 1 is a schematic diagram showing a computer system according to an embodiment of the present invention.

The computer system is a notebook-type portable computer which can be operated by a battery. The computer system has a processor bus 1, a PCI (Peripheral Component Interconnect) bus 2, an ISA (Industry Standard Architecture) bus 3 and an I²C bus 4 on a system board.

The main body of the computer includes a CPU 11, a host-PCI bridge 12, a memory 13, a display controller 14, a PCI-ISA bridge 15, a BIOS ROM 16, a real time clock (RTC) 17, a hard disk drive (HDD) 18, a keyboard controller 19, a radio controller 20, an I/O control gate array 21, a power controller 22, an embedded controller (EC) 23, etc.

The CPU 11 controls the overall computer system. It is operated on the basis of descriptions of an operating system, a device driver and an application program including utility stored in the memory 13, and a system BIOS (Basic I/O System) stored in the BIOS ROM 16. An input/output pin of the CPU 11 is directly connected to the processor bus 1 having a data bus of, for example, a 64-bit width.

The host-PCI bridge 12 is a bridge LSI connecting the processor bus 1 and the PCI bus 2, and functions as one of the bus masters of the PCI bus 2. The host-PCI bridge 12 has a function for converting a bus cycle including data and addresses in both directions between the processor bus 1 and the PCI bus 2, and a function for access-controlling the memory 13 through a memory bus.

The memory 13 is a main memory device of the computer system of the present invention. It stores an operating system, a device driver, application programs including utility, and process data. The memory 13 is connected to the host-PCI bridge 12 through an exclusive memory bus having a data bus of a 32- or 64-bit width.

The PCI bus 2 is an input/output bus of clock synchronous type. All cycles on the PCI bus 2 are carried out in synchronism with PCI bus clocks. The PCI bus 2 has an address/data bus used in a time-division manner.

The display controller 14 controls the outputs from a user interface of the computer system. The display controller 14, as well as the host-PCI bridge 12, is one of the bus masters of the PCI bus 2. It displays image data stored in a video memory (VRAM) 141 on an LCD 142.

The PCI-ISA bridge 15 is a bridge LSI connecting the PCI bus 2 and the ISA bus 3 and functions as one of the PCI devices. The PCI-ISA bridge 15 incorporates a PCI bus arbiter, a DMA controller, etc. The BIOS ROM 16, the RTC 17, the HDD 18, the keyboard controller 19, the radio controller 20, and the I/O control gate array 21 are connected to the ISA bus 3.

The BIOS ROM 16 is a memory device for storing the system BIOS. It comprises a flash memory, so that the program can be rewritten. The system BIOS includes an POST (Power On Self Test) routine which is executed on startup of the system, a system management program, a setup routine, etc.

The system management program is an interrupting program executed in an SMM (System Management Mode). It includes various SMI (System Management Interrupt) service routines, such as an SMI handler, a hot-key process routine, etc. The SMI hander starts up an SMI service routine in accordance with the factor of occurrence of the SMI. When an SMI occurs due to a hot key, the SMI hander starts the hot key process routine. When an SMI occurs due to another factor, the SMI hander starts the SMI service routine corresponding to the factor. The wake-up function (to be described later) is realized by one of the SMI service routines.

The setup routine alters the configuration settings of the system in response to a key input operation by the user. Various settings in connection with the suspend/resume function (to be described later) are executed by the setup routine.

The RTC 17 is a clock module having a CMOS memory backed up by its own battery. The CMOS memory stores various system information including information on the suspend/resume function set in the setup routine. Access to the CMOS memory is executed by the system BIOS.

The HDD 18 is a memory device, serving as an external memory of the computer system. It stores an operating system to be loaded in the memory 13, i.e., the main memory, a device driver, an application program including utility, process data, etc.

The keyboard controller 19 controls the inputs of the user interface of the computer system. It performs key input controls of a keyboard 191 and pointing controls of a pointing device 192.

The radio controller 20 controls radio communications with an external device using radio waves in, for example, the 2.45 GHz frequency band.

The I/O control gate array 21 is a bridge LSI for connecting the ISA bus 3 and the I²C bus 4. It incorporates a plurality of registers which can be read and written by the CPU 11. Communications between the CPU 11 and the power controller 22 on the I²C bus 4 are achieved by means of the registers.

The I²C bus 4 is a bidirectional bus comprising a clock signal line and a data line.

The power controller 22 is connected to the EC 23 through the I²C bus 4. It controls power supply to the respective sections from the battery and an external power source.

The EC 23 is a controller for controlling additional functions of the system. It has a power sequence control function for controlling ON/OFF of the system power in cooperation with the power controller 22.

The suspend/resume function and the wake-up function of the computer system having the above structure will now be described.

The suspend/resume function is a function for storing the operating status of the system in the memory 13 or the HDD 18 when the power switch is turned off, and restoring the operating status when the system is restarted, so that the user can return to the previous status. Whether the operating status of the system is stored in the memory 13 (STR) or the HDD 18 (STD) is selected by the aforementioned setup routine. The information on the selection is stored in the CMOS memory of the RTC 17.

The wake-up function is a function for automatically restarting the system in response to a specified event (wake-up event), for example, when the radio controller 20 receives a signal from an external device, except when the power switch is turned on. The EC 23 is notified of all wake-up events. When the EC 23 receives a notice, it supplies an instruction for turning on the power of the system to the power controller 22. At the same time, it generates an SMI to cause an SMI service routine to be executed, so that the system can be restarted. Whether an event is selected as a wake-up event is determined by the aforementioned setup routine. The information on the selection is stored in the CMOS memory of the RTC 17.

Effectiveness/ineffectiveness of the suspend/resume function and the wake-up function is also set by the aforementioned setup routine. The information on this matter is stored in the CMOS memory of the RTC 17.

Figure 2:
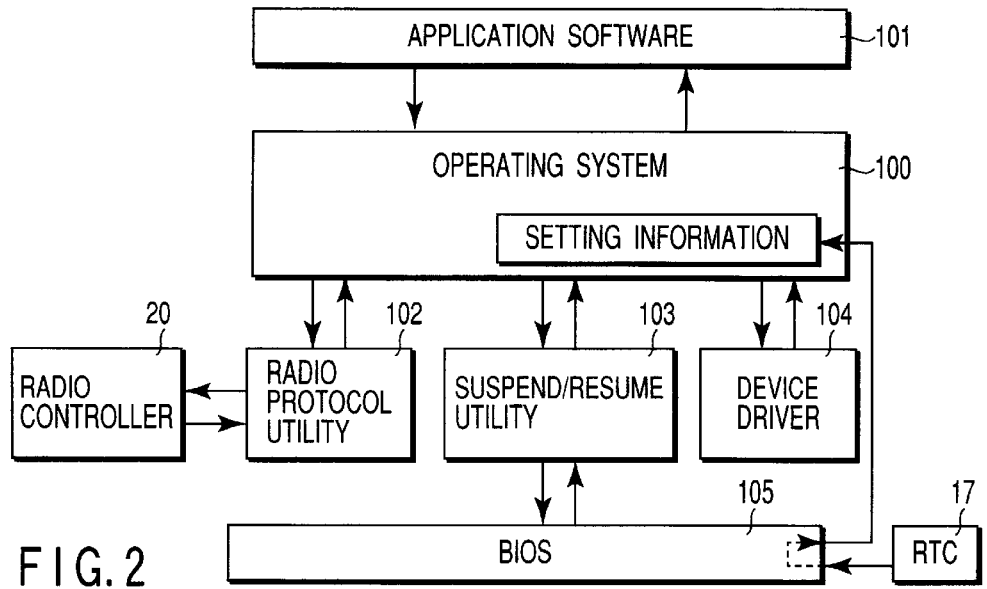
FIG. 2 is a block diagram showing a part of a software constitution of the computer system according to the embodiment of the present invention.

FIG. 2 is a block diagram showing a part of a software constitution of the computer system of the above embodiment.

Resource management of the computer system 100, such as scheduling, is executed by an operating system 100. Under the control of the operating system, application software 101, radio protocol utility 102, suspend/resume utility 103 and a device driver 104 are operated. The operating system 100 also includes various control programs for performing the suspend/resume function and the wake-up function.

The application software 101 is general software, such as document composition software and spreadsheet software. The radio protocol utility 102 is software for driving the radio controller 20 for transmitting and receiving data in conformity with the radio communication protocol. The suspend/resume utility 103 is software for controlling the suspend/resume function of the additional functions of the computer system. The device driver 104 is software for driving various peripherals.

The operating system 100 is started up by the POST routine of the system BIOS 105 executed when the system is initiated. At this time, the operating system 100 obtains various setting information stored in the CMOS memory of the RTC 17 and read by the IRT routine. When the power switch is turned off, the operating system 100 determines whether the suspend/resume function is effective or ineffective based on the setting information. If the function is determined to be effective, the operating system 100 further determines whether STR of STD is selected. The notice on the determination is given to the suspend/resume utility 103.

If the suspend/resume utility 103 is notified that STD is selected, it obtains through the BIOS 105 setting information representing whether the wake-up function is effective or ineffective and whether wake-up events are selected or not. If the setting information represents that reception of a signal by the radio controller 20 from an external device is selected as a wake-up event and the wake-up function is valid, the suspend/resume utility 103 supplies to the operating system 100 a response to the effect that the suspending process is performed in STR instead of STD. In the other cases, it responds to the operating system 100 that the suspending process is performed by the notified mode.

The operating system 100 executes the suspending process in STR or STD in accordance with the response from the suspend/resume utility 103.

As described above, in the computer system of this embodiment, when there is a possibility of the resume process being performed under an unsteady condition where the apparatus is liable to receive vibration or shock, STR using the memory 13 which is more vibration-resistant than the hard disk drive (HDD) is forcibly selected regardless of the user's selection. Therefore, corruption of data and a breakdown of the apparatus are prevented.

A modification of the above embodiment will be described. When the suspend/resume utility 103 is notified of STD by the operating system 100 and the setting information obtained through the BIOS 105 represents that reception of a signal by the radio controller 20 from an external device is selected as a wake-up event and the wake-up function is effective, the suspend/resume utility 103 does not unconditionally supply a response for execution of the suspending process in STR to the operating system 100. Instead, the suspend/resume utility 103 displays for the user a warning that the resume processing may be performed under an unsteady condition where the apparatus is liable to receive vibration or shock, so that the user can re-designate STR or STD. The suspend/resume utility 103 responds to the operating system 100 that the suspending process is performed by the mode designated by the user. Then, the operating system 100 executes the suspending process in STR or STD in accordance with the response from the suspend/resume utility 103.

With the modification described above, when there is a possibility of the resume process being performed under an unsteady condition where the apparatus is liable to receive vibration or shock, the apparatus gives a warning to prompt the user to change the mode from STD to STR. Thus, corruption of data or a breakdown of the apparatus is prevented.

When the wake-up function is effective, the control for changing the mode from STD to STR may be executed by the system BIOS 105. In this case, the suspending process is not necessarily executed by the operating system 100, but the system BIOS 105 itself may perform the process.

Figure 3:
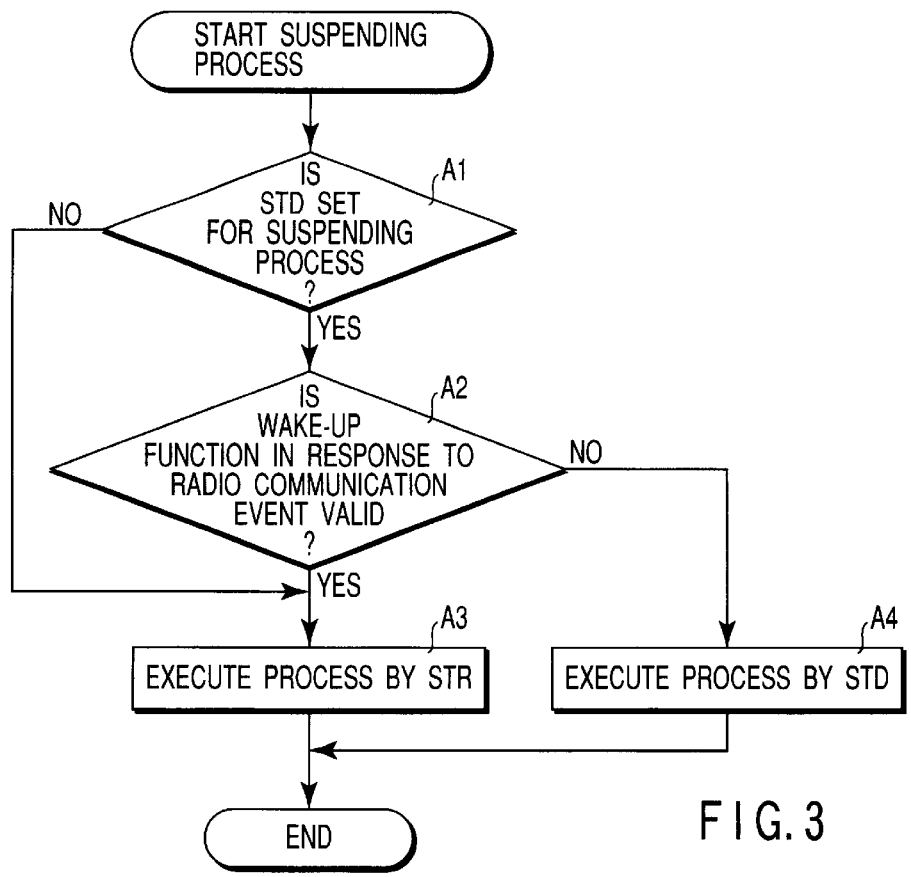
FIG. 3 is a flowchart for explaining operation procedures of a first suspend control in the computer system of the embodiment.
Figure 4:
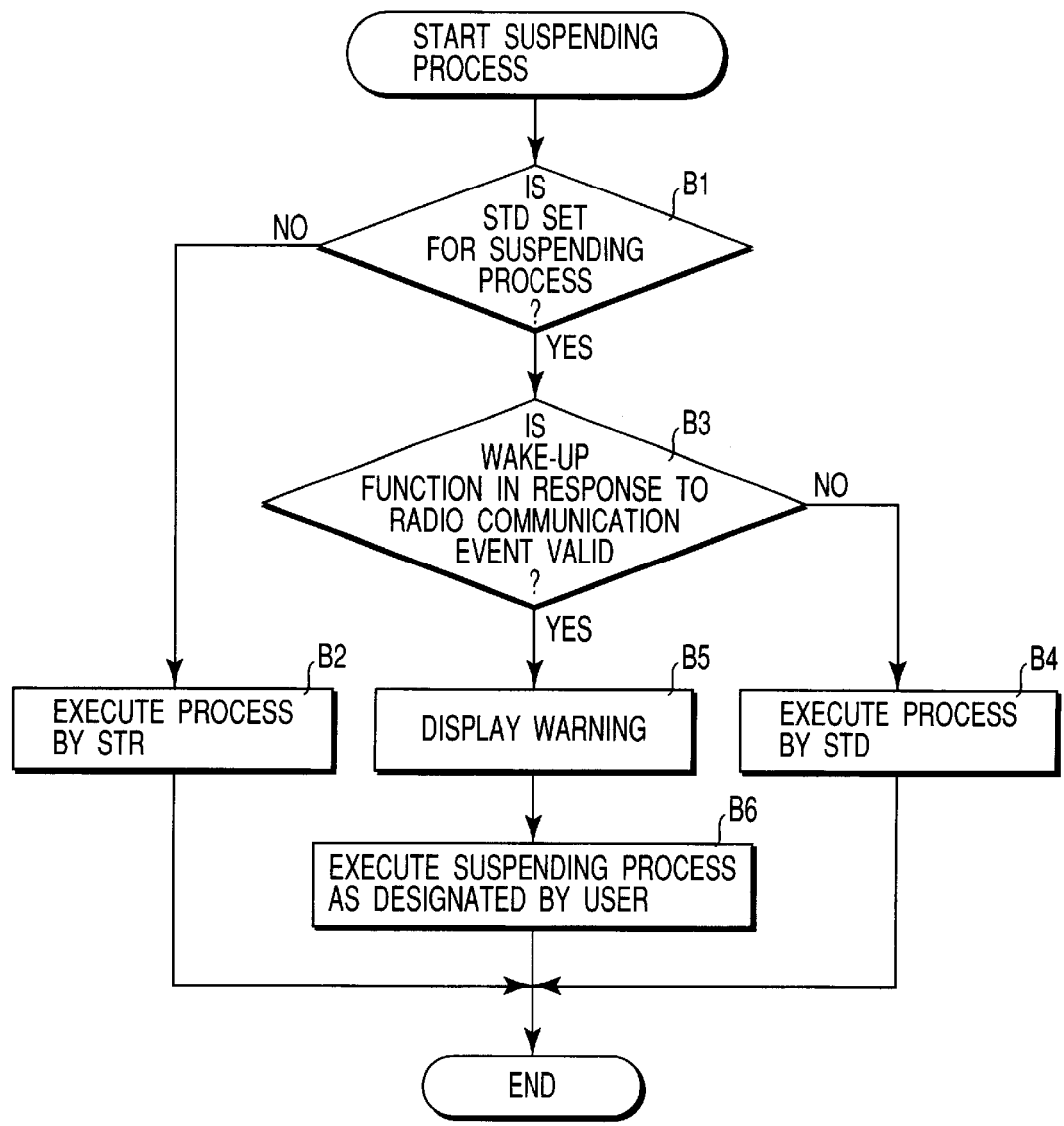
FIG. 4 is a flowchart for explaining operation procedures of a second suspend control in the computer system of the embodiment.

FIGS. 3 and 4 are flowcharts for explaining operation procedures of suspend controls in the computer system of the above embodiments.

Operation procedures of a first suspend control will be described with reference to FIG. 3.

When the suspending process is started, first, it is determined whether STD is set for the suspending process (step A1). If STR is set (NO in step A1), the suspending process is executed in STR (step A3).

On the other hand, if STD is set for the suspending process (YES in step A1), it is determined whether the wake-up function in response to a radio communication event is effective or not (step A2). If it is effective (YES in step A2), the suspending process is forcibly executed in STR, not STD (step A3). If it is not effective (NO in step A2), the suspending process is executed by STD (step A4).

Operation procedures of a second suspend control (the modification) will be described with reference to FIG. 4.

When the suspending process is started, first, it is determined whether STD is set for the suspending process (step B1). If STR is set (NO in step B1), the suspending process is executed in STR (step B2).

On the other hand, if STD is set for the suspending process (YES in step B1), it is determined whether the wake-up function in response to a radio communication event is effective or not (step B3). If it is not effective (NO in step B3), the suspending process is executed in STD (step B4). If it is effective (YES in step B3), the apparatus displays for the user a warning that the resume processing may be performed under an unsteady condition where the apparatus is liable to receive vibration or shock (step B5). The suspending process is executed by a mode designated by the user in response to the warning (step B6).

As described above, the computer system of this embodiment performs a suitable suspend control in consideration of the risk of a restart when the memory device having a relatively low resistant to vibration is used, under an unsteady condition where the system is liable to receive vibration or shock.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information processing apparatus having an operating mode and a non-operating mode, comprising:

first memory;

second memory having a higher resistance to vibration than that of the first memory;

means for setting at least one of the first memory and the second memory to store an operating status of the apparatus;

means for receiving a predetermined signal;

means for switching the operating mode to the non-operating mode;

means for storing the operating status to the set memory, when the switching means switches the operating mode to the non-operating mode; and means for restoring the apparatus from the non-operating mode to the operating mode based on the stored operating status when a predetermined condition is satisfied, wherein the storing means stores the operating status to the second memory regardless of the setting if reception of the predetermined signal corresponds to the predetermined condition.

2. The information processing apparatus according to claim 1, wherein the receiving means receives a predetermined radio wave.

3. The information processing apparatus according to claim 2, wherein the receiving means receives a radio wave in a 2.45 GHz frequency band.

4. The information processing apparatus according to claim 1, wherein the first storing means is a hard disk drive and the second storing means is a semiconductor memory device.

5. An information processing apparatus having an operating mode and a non-operating mode, comprising:

first memory;

second memory having a higher resistance to vibration than that of the first memory;

means for setting at least one of the first memory and the second memory to store an operating status of the apparatus;

means for receiving a predetermined signal;

means for switching the operating mode to the non-operating mode;

means for storing the operating status to the set memory, when the switching means switches the operating mode to the non-operating mode;

means for restoring the apparatus from the non-operating mode to the operating mode based on the stored operating status when a predetermined condition is satisfied; and means for alarming if reception of the predetermined signal corresponds to the predetermined condition, when the storing means stores the operating status to the first memory.

6. The information processing apparatus according to claim 5, wherein the receiving means receives a predetermined radio wave.

7. The information processing apparatus according to claim 6, wherein the receiving means receives a radio wave in a 2.45 GHz frequency band.

8. The information processing apparatus according to claim 5, wherein the first memory is a hard disk drive and the second storing means is a semiconductor memory device.

9. A mode switching method of an information processing apparatus having receiving means for receiving a predetermined signal, first memory, second memory having a higher resistance to vibration than that of the first memory, and restoring means for restoring an operating status stored in the first memory or the second memory when a predetermined condition is satisfied, the method comprising the steps of:

setting at least one of the first memory and the second memory to store an operating status of the apparatus; and storing the operating status to the second memory regardless of the setting, if reception of the predetermined signal corresponds to the predetermined condition.

10. The mode switching method according to claim 9, wherein the receiving step receives a predetermined radio wave.

11. The mode switching method according to claim 9, wherein the receiving step receives a predetermined radio wave having a 2.45 GHz frequency band.

12. A mode switching method of an information processing apparatus having receiving means for receiving a predetermined signal, first memory, second memory having a higher resistance to vibration than that of the first memory, and restoring means for restoring an operating status stored in the first memory or the second memory when a predetermined condition is satisfied, the method comprising the steps of:

setting at least one of the first memory and the second memory to store an operating status of the apparatus; and alarming if reception of the predetermined signal corresponds to the predetermined condition, when the operating status is stored in the first memory.

13. The mode switching method according to claim 12, wherein the receiving step receives a predetermined radio wave.

14. The mode switching method according to claim 12, wherein the receiving step receives a predetermined radio wave having a 2.45 GHz frequency.

* * * * *